United States Patent [19]

Fortini et al.

[11] 4,108,241
[45] Aug. 22, 1978

[54] HEAT EXCHANGER AND METHOD OF MAKING

[75] Inventors: Anthony Fortini, Cleveland; John M. Kazaroff, Rocky River, both of Ohio

[73] Assignee: The United States of America as represented by the Administrator of the National Aeronautics and Space Administration, Washington, D.C.

[21] Appl. No.: 559,846

[22] Filed: Mar. 19, 1975

[51] Int. Cl.² .......................................... F28F 13/00
[52] U.S. Cl. .................................. 165/146; 165/169; 60/267; 239/127.1
[58] Field of Search .............. 165/DIG. 10, 146, 169; 60/267; 239/127.1

[56] References Cited

U.S. PATENT DOCUMENTS

| | | | |
|---|---|---|---|
| 2,401,797 | 6/1946 | Rasmussen | 165/DIG. 10 |
| 2,448,315 | 8/1948 | Kunzog | 165/DIG. 10 |
| 2,487,435 | 11/1949 | Goddard | 165/DIG. 10 |
| 3,161,478 | 12/1964 | Chessin | 165/DIG. 10 |
| 3,170,512 | 2/1965 | Smith | 165/DIG. 10 |
| 3,211,133 | 10/1965 | Valyi | 165/DIG. 10 |
| 3,262,190 | 7/1966 | Rostoker | 165/DIG. 10 |
| 3,289,756 | 12/1966 | Jaeger | 165/DIG. 10 |
| 3,302,704 | 2/1967 | Valyi | 165/DIG. 10 |
| 3,306,353 | 2/1967 | Burne | 165/DIG. 10 |
| 3,364,951 | 1/1968 | Burne | 165/DIG. 10 |
| 3,798,902 | 3/1974 | Butter | 60/267 |

Primary Examiner—Charles J. Myhre
Assistant Examiner—Margaret A. LaTulip
Attorney, Agent, or Firm—N. T. Musial; J. R. Manning; J. A. Mackin

[57] ABSTRACT

A heat exchanger of increased effectiveness is disclosed. A porous metal matrix is disposed in a metal chamber or between walls through which a heat-transfer fluid is directed. The porous metal matrix has internal bonds and is bonded to the chamber in order to remove all thermal contact resistance within the composite structure. Utilization of the invention in a rocket chamber is disclosed as a specific use. Also disclosed is a method of constructing the heat exchanger.

5 Claims, 5 Drawing Figures

HEAT EXCHANGER AND METHOD OF MAKING

ORIGIN OF THE INVENTION

This invention was made by employees of the U.S. Government and may be manufactured or used by or for the Government of the United States for governmental purposes without any payment of royalties thereon or therefor.

BACKGROUND OF THE INVENTION

This invention relates to apparatus for transferring heat from a first environment to a second environment of lower temperature and is directed more particularly to devices known as heat exchangers.

Basically, a heat exchanger includes a wall of high heat conductivity metal separating two environments of different temperatures. If the wall is the shell of a device such as a rocket chamber, for example, which must be protected from destruction by the combustion inside the rocket chamber, a coolant medium or fluid may be directed or flowed over the outer surface of the wall to absorb the heat.

Other examples of heat exchangers include the automobile radiator which comprises a plurality of tubes through which there is directed the liquid coolant from an engine. The temperature of the coolant is reduced by air directed against the radiator tubes.

In the past, attempts to increase the heat transfer have included roughening the surface of the wall in contact with the flowing fluid, increasing the fluid velocity by decreasing the cross-sectional area of the coolant tubes or channels and/or increasing the pressure drop across each channel to increase fluid velocity. Additionally, the use of fins on the dividing wall or which extend radially inwardly or outwardly from the cooling tubes have been utilized.

Some of the problems which result from previous prior art attempts to increase the heat transfer include lack of control of surface roughness, low cycle thermal fatigue problems which result from joining different sections of material by welding or brazing or the like, the difficulty of machining suitable size channels in thin walls and confined spaces, and the difficulty of machining fins in small channels.

OBJECTS AND SUMMARY OF THE INVENTION

It is an object of the invention to provide a new and novel heat exchanger having heat-transfer enhancement.

It is another object of the invention to provide a heat exchanger wherein the velocity of a flowing heat-transfer medium is maintained at a relatively low magnitude, thereby avoiding the need for special pumps to develop a high pressure for the heat-transfer medium.

Still another object of the invention is to provide a heat exchanger and a method of making the exchanger, both of which are relatively simple as compared to the prior art.

Yet another object of the invention is to provide for a rocket engine, a heat exchanger which will cause maximum heat transfer to a coolant fluid at the rocket throat where inner wall temperatures are the highest.

A still further object of the invention is to provide a method of making a rocket chamber having maximum heat transfer at the throat area.

In summary, it is an object of the invention to provide a heat exchanger of high effectiveness which is simple in construction and which may be easily altered to provide areas of increased heat transfer and which is relatively simple to construct.

DESCRIPTION OF A PREFERRED EMBODIMENT

Figure 1:
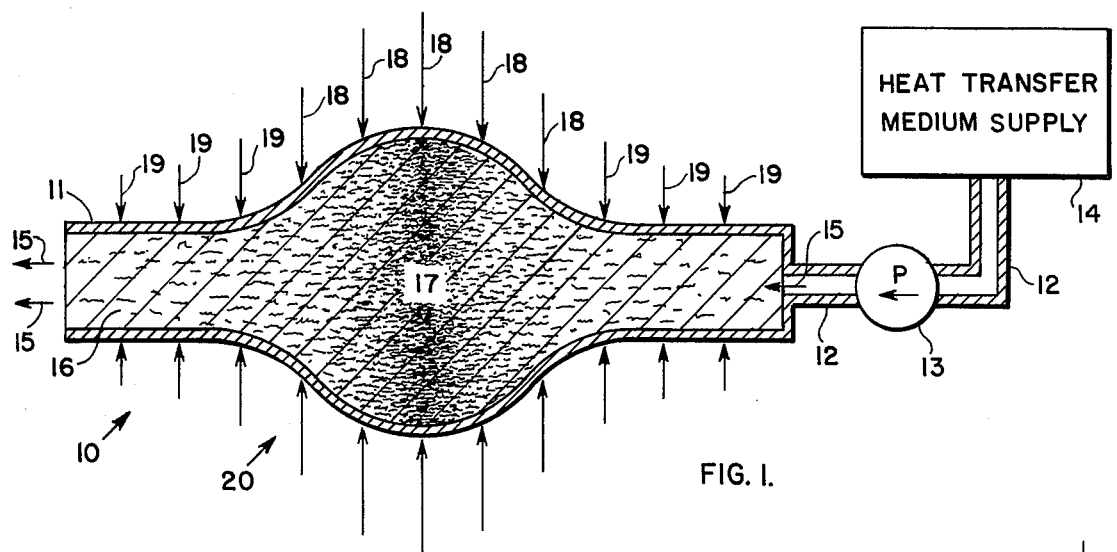
FIG. 1 is an axial section of the heat exchanger embodying the invention.

Referring now to FIG. 1, there is shown a heat exchanger 10 which comprises a tubular shell 11 connected through a supply conduit 12 and through a pump 13 to a heat-transfer medium or fluid supply 14. While the heat exchanger will be discussed as being in a high temperature environment and with the coolant being supplied from the heat-transfer medium supply 14, it will be understood that the heat exchanger can be utilized to transfer heat in the opposite direction, that is the heat-transfer medium would be of higher temperature than the environment outside of the heat exchanger. The coolant flows from supply 14 through the conduit 12 and pump 13 and the heat exchanger 10, as shown by the arrows 15.

Disposed in the tube 11 is a porous metal matrix 16 which has a greater density as at 17 than it does at the ends of the tube 11. This increased density of the porous metal matrix at 17 increases the internal heat-transfer coefficient of the porous matrix in an area where the temperature of the environment is much greater than at the end of tube 11 where the coolant enters or at the opposite end where the coolant is exhausted. The high temperature and/or heat flux is represented by arrows 18 while the lower temperatures and/or heat flux toward the ends of tube 11 are represented by the short arrows 19.

While the increased density of the porous metal matrix as at 17 will increase the heat transfer, it will also reduce the volume of coolant flowing through tube 11 if it is of constant diameter. To the end that the reduction of coolant flow volume caused by the increased density of the porous metal matrix at 17 will be minimized or eliminated, the diameter of tube 11 is increased as at 20, thereby providing a maximum cross-sectional area where the density of the porous metal matrix is greatest so that the overall flow rate and pressure drop is equivalent to that of a straight tube.

Ideally, the density of the porous metal matrix 16 should increase or decrease proportionately in accordance with the temperatures and/or heat flux being impressed on the tube 11. In other words, the density of the porous metal matrix 16 preferably follows the temperature profile of the heat flux along the length of the tube 11. Likewise, the increased diameter of tube 11 at 20 preferably followed the temperature and/or heat flux profile curve and, of course, will be maximum where heat flux and/or temperature is maximum and minimum where heat flux and/or temperature is minimum.

The heat exchanger 10 may be constructed by forming a body of porous metal, as for example, sintered metal powder, sintered fibers, woven sintered wire cloth or foam metal, or other porous metal bodies such as photoetched plates or laser drilled plates with randomly arranged pores or openings into the desired shape which may be cylindrical and which may include one or more of the increased diameter portions, as shown at 20 in FIG. 1. A tube 11 may then be formed over the porous metal matrix by electroforming, sputtering or the like.

As an alternative, the heat exchanger 10 may be constructed by first forming tube 11 including, if desired, one or more portions of increased diameter. Such methods are well known in the art. Tube 11 may then be filled with sintered metal powder, metal fibers or the like. The tube 11 and its contents are then heated to a temperature high enough to cause bonding or welding of the contents of tube 11 to form a porous metal matrix and to bond or weld to the tube 11. The bonding or welding of all points of metal to metal contact provides maximum heat transfer by eliminating normal high thermal resistance contact points.

The metals used for the tube 11 and for the porous metal matrix 16 are those having the best heat-transfer characteristics. However, the selection of metals will depend upon the environment and other materials with which the heat exchanger comes in contact, and will also depend upon the coefficients of expansion of the metals used for the porous matrix 16 and the tube 11. In forming the heat exchanger 10, sputtering may have some important advantages in that a greater number of alloys can be deposited over the porous metal matrix than can be deposited by electroforming.

Figure 2:
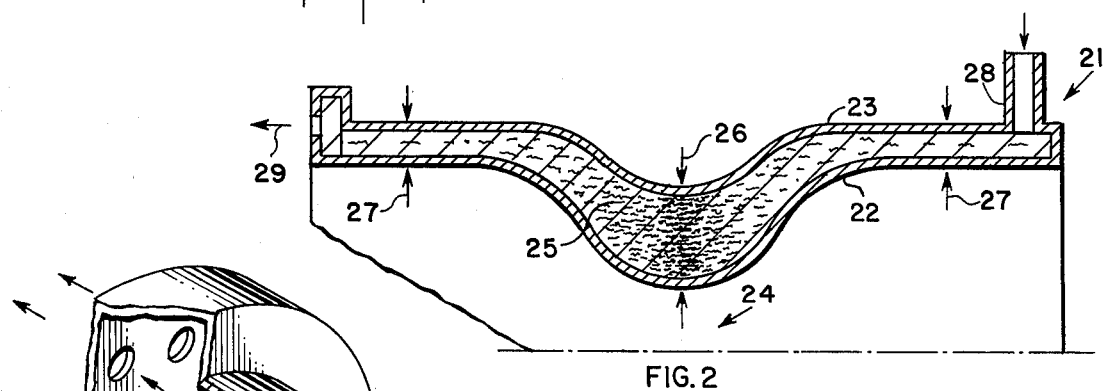
FIG. 2 is a half axial section of the rocket chamber embodying the invention.

Referring now to FIG. 2, there is shown a half axial section of a rocket chamber 21 having an inner annular wall 22 and an outer annular wall 23 configured so as to produce a throat 24. The space between the inner wall and the outer wall 23 contains a porous metal matrix 25 which is bonded or welded to the inner and outer walls 22 and 23, respectively, by suitable bonding or welding techniques. A coolant fluid is directed to a manifold 28 at the downstream end of the rocket nozzle and flows through the matrix 25 in an upstream direction, i.e., opposite to the flow of combustion gases exiting as shown by arrow 29. Of course, the coolant flow may be in the opposite direction to that shown in FIG. 2, if desired. The distance between walls 22 and 23 is much greater at the throat area as indicated by arrows 26 than it is at the upstream or downstream ends, as indicated by arrows 27. Additionally, the density of the porous metal matrix 25 may be much greater at the throat area 24 than it is at the upstream or downstream ends of the chamber, as is shown in FIG. 2.

Figure 3:
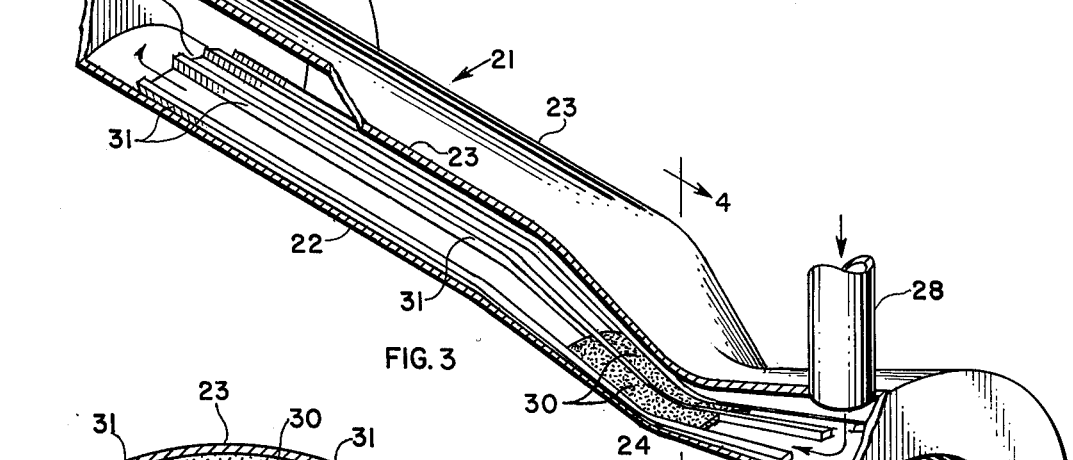
FIG. 3 is a partially cuataway oblique view of a rocket chamber embodying the invention.

FIG. 3 is a partial cutaway view of a rocket chamber similar to that shown in FIG. 2 and corresponding parts are identified by like numerals. In the rocket chamber 21 of FIG. 3, elongated porous metal matrix slugs 30 are disposed in an annular configuration around the throat 24 between inner and outer walls 22 and 23. The slugs 30 are separated by longitudinal ribs 31 which extend substantially the full length of the rocket chamber. Ribs 31 and the slugs 30 are bonded or welded to the inner wall and to the outer wall and, in addition, each rib is bonded or welded to the slugs 30 adjacent to it. The slugs 30 increase the heat transfer in the area of the throat where inner wall temperature is maximum to provide maximum protection of the rocket chamber from destruction. It will be understood that the slugs 30 shown in FIG. 3 may extend the full length of rocket chamber 21 or any part thereof, as desired. Also, in accordance with the construction shown in FIGS. 1 and 2, the density of the porous metal matrix may be selectively varied to provide additional heat transfer where desirable. In the event that ribs 31 are not to be used, the porous metal matrix may likewise extend the full length of the rocket chamber and may have selective areas of increased density for greater heat transfer.

The elongated ribs 31 establish flow channels for the coolant but are not necessary to obtain the advantages of the invention. Accordingly, a rocket chamber may be constructed wherein a continuous, annular ring, configurated to form a throat for the rocket chamber is used in place of the slugs 30. As will be explained hereinafter, the slugs may be formed by cutting slots in the porous metal ring.

Figure 4:
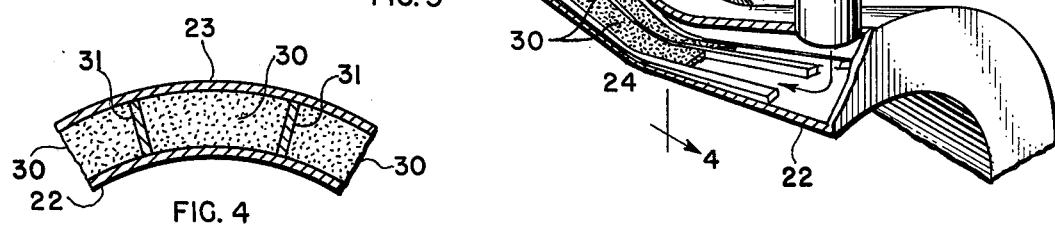
FIG. 4 is a partial cross section of the rocket chamber of FIG. 3 taken along the lines 4—4.

FIG. 4 is a partial cross-sectional view taken along the line 4—4 of FIG. 3 and shows the ribs 31 disposed between the inner and outer walls 22 and 23 and the porous metal matrix slugs 30.

Figure 5:
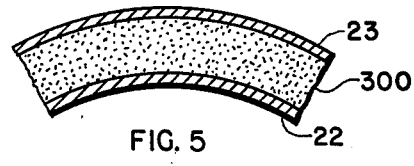
FIG. 5 is a view of a modification to the structure shown in FIG. 4.

FIG. 5 is a cross-sectional view similar to FIG. 5 showing an embodiment without the ribs 31 wherein the slugs are replaced by a continuous annular ring 30 of porous metal.

The rocket chamber 21, as shown in FIG. 3, may be constructed as described hereinafter. Various techniques involving electroforming, sputtering, diffusion bonding and various machining steps have been used in the past to construct rocket chambers. However, new steps are now involved due to Applicants' use of porous metal matrix between the inner and outer walls of a rocket chamber to increase the heat transfer effectiveness. In one method of making a rocket chamber according to the instant invention, the inner wall 22 of the rocket chamber is constructed on a suitably shaped split mandrel by either electroforming techniques or by spinning; that is, by forcing a metal sleeve or cylinder to conform to the mandrel while the mandrel and the sleeve are rotating. A porous metal matrix in the form of a ring, as shown at 300 in FIG. 5 is next formed around the rocket chamber inner wall 22 after the outer surface of the wall 22 is machined to the desired dimensions. The porous metal matrix may be formed by wrapping wire around the wall 22, by disposing the two halves of a split porous metal matrix ring around the chamber wall 22 or by positioning slugs 30 of porous metal around the wall 22, as shown in FIGS. 3 and 4.

If no ribs 31 are to be utilized, either a layer of wax or a layer of leachable material, depending on whether the outer wall is to be formed by electroforming or sputtering, is formed on the exterior of the rocket chamber wall 22 but excluding the porous metal ring 300. The outer rocket chamber wall 23 is formed by electroforming or sputtering and, of course, will bond to the porous metal matrix ring 300 or slugs 30 if the latter are used.

If ribs 31 are desired to form coolant channels, grooves must be machined in the wax layer or leachable layer prior to forming the outer wall 23. This groove-machining operation may also be extended to the porous metal matrix ring 300 whereby the ribs 31 will also be deposited between the slugs 30 thus formed and will be bonded to those slugs.

After the outer wall is formed, the split mandrel is removed and the inner surface of the inner wall 22 may be machined to a desired contour. At this point, the porous metal matrix ring 300 or slugs 30 are not bonded to the inner wall 22. To accomplish such bonding, the rocket chamber assembly may be heated to a temperature sufficiently high to produce bonding between the porous metal matrix ring 300 or slugs 30.

To reduce the temperature of the diffusion bonding step so that undesirable annealing of the inner wall 22 may be avoided, a relatively low temperature solder material of the types which are well known in the art may be applied to the outer surface of the wall 22 in the areas where the porous metal matrix is to be positioned. The solder material will bond the porous metal matrix material to the inner wall 22 without resorting to the relatively high diffusion bonding temperatures normally required.

The diffusion bonding step may be advantageously eliminated by machining away the inner wall 22 completely after the mandrel is removed. The inner wall 22 is then reformed, either by electroforming or sputtering techniques and is applied directly to the surface of the porous metal matrix ring 300 or the slugs 30. The wax or leachable material is then removed from between the inner wall 22 and the outer wall 23, as well as from all other areas of the rocket chamber.

The inlet manifold at the downstream end of the rocket chamber and the coolant exit manifold at the upstream end of the rocket chamber are added by any of the well-known techniques of the prior art.

The construction of a rocket chamber in accordance with the invention need not be restricted to one technique such as electro-forming but may include other methods. For example, it may be desirable to form the inner wall of any alloy which may be advantageously sputtered, this being done after the outer wall has been electroformed. On the other hand, there are instances where it would be preferable to sputter-deposit the outer wall.

It will be understood that those skilled in the art may make changes and modifications to the above-described invention without departing from the spirit and scope thereof, as set forth in the claims appended hereto.

What is claimed is:

1. A Heat exchanger for transferring heat from an environment at one temperature to a heat-transfer fluid or vice-versa, said fluid being supplied from a heat-transfer fluid source, said heat exchanger comprising:
    a chamber formed of a metal having high thermal conductivity and having an inlet and an outlet,
    a porous metal matrix of high thermal conductivity disposed in said chamber, said porous matrix being metallically bonded to said chamber; all points of contact within said metal matrix being metallically bonded; and
    means for directing a heat-transfer medium into said inlet, said heat-transfer medium flowing through said chamber and exhausting through said outlet, said chamber and said porous media having a greater cross-sectional area at areas of high heat exchanger than at positions of low heat exchange, and wherein both the density of said porous metal matrix and the cross-sectional area of said chamber vary along the direction of coolant flow in said chamber in proportion to the variation of heat flux of said chamber along the direction of coolant flow.

2. The heat exchanger of claim 1 wherein said metallic bond of said chamber and said matrix is a sputtered bond.

3. The heat exchanger of claim 1 wherein said metallic bond of said chamber and said matrix is an electrodeposited bond.

4. The heat exchanger of claim 1 wherein at least one of said metals is a metal alloy.

5. The heat exchanger of claim 1 wherein both the density of said porous metal matrix and the cross-sectional area of said chamber vary along the direction of coolant flow in said chamber in proportion to the variation of heat flux on said chamber along the direction of coolant flow.

* * * * *